(No Model.)
G. D. EDMONDSON.
OPTOMETER.
No. 255,845. Patented Apr. 4, 1882.
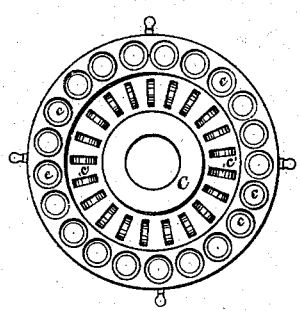
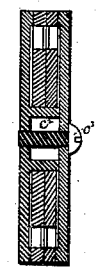
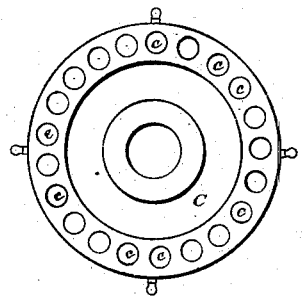
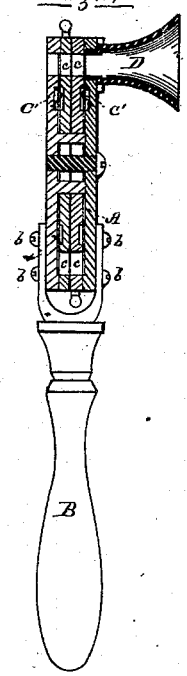
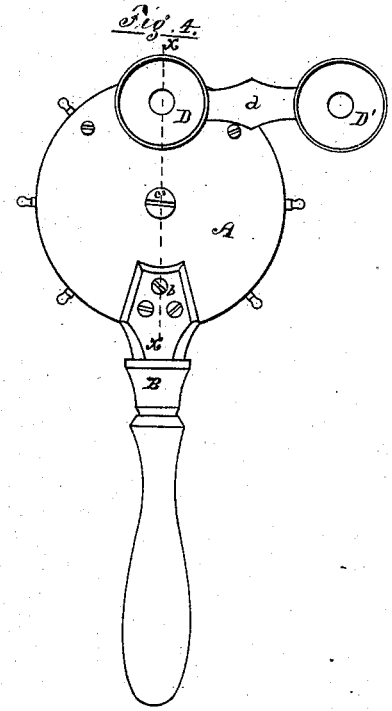
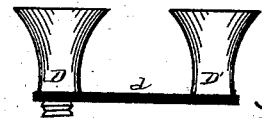
WITNESSES.
Samuel E. Thomas
Henry F. Quelch
INVENTOR.
George D. Edmondson
By W. W. Leggett
ATTORNEY.

UNITED STATES PATENT OFFICE.

GEORGE D. EDMONDSON, OF DETROIT, MICHIGAN.

OPTOMETER.

SPECIFICATION forming part of Letters Patent No. 255,845, dated April 4, 1882.

Application filed March 18, 1881. (No model.)

*To all whom it may concern:*

Be it known that I, GEORGE D. EDMONDSON, of Detroit, county of Wayne, State of Michigan, have invented a new and useful Improvement in Optometers; and I declare the following to be a full, clear, and exact description of the same, such as will enable others skilled in the art to which it pertains to make and use it, reference being had to the accompanying drawings, which form a part of this specification.

My invention relates to that class of instruments used for trying the length of vision and adapting spectacles to the eye; and it consists in a novel instrument for this purpose, as will be hereinafter fully described.

In the drawings, Figure 1 is a view of one of the rotating frames. Fig. 2 is a reverse view of the same. Fig. 3 is a sectional view of the instrument with the rotating frames in position. Fig. 4 is an elevation of the instrument with the various parts attached. Fig. $4^a$ is a view partially in cross-section in the plane indicated by the line $x\, x$, Fig. 4; and Fig. 5 is a side view of the eye-pieces.

The object of my invention is to provide an instrument which shall readily and accurately determine the focal distance required for the lens suited to the sight, and also to test the vision with both eyes wide open, although only one eye is tested at once.

To this end A is the outside shell of a test-lens. B is the handle, fastened to outside shells by small screws $b$. C is a rotating frame, which is drilled out into holes $c$ for the reception of lenses of different focus. D is an eye-piece, which is attached in any suitable manner to the outer shell, A, and which is provided with a shoulder, so that the cross-piece $d$ may be attached to it. At the other extremity of cross-piece $d$ is situated another eye-piece, D′, which is placed in such a position that when the individual whose eyes are being tested is looking through eye-piece D the other eye comes directly opposite eye-piece D′.

It will be seen in the above description, as well as in the drawings, that my invention can be easily adapted to suit all sights, inasmuch as I provide sufficient lenses to determine to the minutest degree the focal length of sight, and at the same time to designate the lens best suited to remedy the imperfect vision.

My device consists in providing outer shells or cases having one or more holes in them suited to receive the eye-piece D and hold it firmly. This may be done in the casting, when composed of metal, or drilled and then tapped with a screw-thread; but I do not confine myself to tapping. The eye-piece D may extend back of the case and be turned over or riveted down. Between these outside cases I place one or more rotating frames or disks, C, which have spaces, circular or square, cast or drilled in them for the reception of lenses, which may be securely fastened therein in any suitable manner, preferably by a spring similar to that used in keeping in the glass of a locket.

It will be observed that the eye-pieces are attached to the outer shell upon a pivot, and that one of them is a blind-piece. The other is arranged in such position that the person desiring to test the sight looks directly through the lens or lenses with one eye and the other eye looks into the blind-piece, and thus the necessity of closing one eye is obviated, as in closing the eye the detraction from the sight of the other one is very great and focus is decreased, so that spectacles furnished do not suit the wearer, and in place of benefiting the eyesight only serve to injure it.

For the purpose of holding the rotating frames or disks in position I have provided springs which press outwardly or inwardly into slots $c'$. I have also provided a collar, $c^2$, on one of the outside shelves, upon which the frames or disks are pivoted, and the whole is held firmly in position by means of screw $c^3$, which runs through from side to side.

My device may be made of any suitable material—such as brass, copper, vulcanite, &c.— and may be cast or molded ready for putting together; or it may be cast and drilled out and otherwise finished afterward.

The method of using my device is as follows: The person testing the sight holds the instrument so that the eye is directly opposite and close to the eye-piece D, so that he can see through the lenses situated in the rotary disks. The disks are then turned until the lens is found which will give distinct vision at a predetermined distance, and suitable numbers or other marks which may be placed on the edges of the disks will indicate the style of glass necessary for the sight being tested. Should it be necessary to test the other eye, it is simply necessary to turn the blind-piece so that the other eye looks into it—that is, to the right or left, as the case may be.

I am aware that optometers have been provided with frames pivoted singly and carrying annular series of lenses, any one of which may be brought in line with an eye-piece, and I do not claim such an instrument.

What I claim is—

1. An optometer or instrument for adapting lenses to the sight, consisting of a series of rotary frames pivoted face to face and carrying at intervals lenses of different powers, an eye-piece or rest, and a stationary lens-support, substantially as described, whereby any lens or combination of lenses may be brought in line with the eye or another lens, substantially as described.

2. In an optometer, the outside shell consisting of two plates, between which the series of frames are pivoted face to face, said plates being provided with orifices for the reception of an eye-piece or rest through which any lens or combination of lenses may be brought into juxtaposition with the eye or another lens, substantially as and for the purpose set forth.

In testimony whereof I sign this specification in the presence of two witnesses.

GEO. D. EDMONDSON.

Witnesses:
WM. M. PORTER,
HENRY F. QUELCH.